US010891432B2

(12) United States Patent
Liao et al.

(10) Patent No.: US 10,891,432 B2
(45) Date of Patent: Jan. 12, 2021

(54) SYSTEM AND PROCESS FOR GENERATING AN INTERNET APPLICATION

(71) Applicant: Roar Software Pty Ltd., Sydney (AU)

(72) Inventors: Kevin Liao, Sydney (AU); Lawrence Xiang Yao, Homebush West (AU); Jeffrey Lin, Bardwell Park (AU)

(73) Assignee: Roar Software Pty Ltd., Sydney (AU)

( * ) Notice: Subject to any disclaimer, the term of this patent is extended or adjusted under 35 U.S.C. 154(b) by 227 days.

(21) Appl. No.: 14/942,126

(22) Filed: Nov. 16, 2015

(65) Prior Publication Data

US 2017/0060830 A1 Mar. 2, 2017

(30) Foreign Application Priority Data

Aug. 26, 2015 (AU) ................................ 2015903445

(51) Int. Cl.
*G06F 40/00* (2020.01)
*G06F 40/18* (2020.01)
*G06F 40/186* (2020.01)

(52) U.S. Cl.
CPC ............ *G06F 40/18* (2020.01); *G06F 40/186* (2020.01)

(58) Field of Classification Search
CPC .................. G06F 17/246; G06F 17/248; G06F 17/30005; G06F 40/18; G06F 40/186
See application file for complete search history.

(56) References Cited

U.S. PATENT DOCUMENTS

| 8,370,464 | B1 * | 2/2013 | Chitilian | ............... G06F 17/246 709/220 |
| 8,812,625 | B1 * | 8/2014 | Chitilian | ........... H04L 29/08981 709/220 |
| 9,953,018 | B2 * | 4/2018 | Keslin | ................. G06Q 10/101 |
| 10,067,928 | B1 * | 9/2018 | Krappe | ................... G06F 40/18 |
| 2003/0172168 | A1 * | 9/2003 | Mak | ...................... G06F 16/258 709/230 |

(Continued)

FOREIGN PATENT DOCUMENTS

CN 103324731 A * 9/2013
JP 2016224550 A * 12/2016

*Primary Examiner* — William L Bashore
*Assistant Examiner* — David Faber
(74) *Attorney, Agent, or Firm* — Kaplan Breyer Schwarz, LLP

(57) ABSTRACT

System for converting a spreadsheet in a first format to a second format comprising: a server including a storage means adapted to store the spreadsheet in the second format and store an associated template; a data set associated with the spreadsheet in the second format, such that the data set is adapted to be associated with the template to be displayed on a client device; and wherein when data is associated with the template, changes made via the client device to the associated data is recorded in realtime in both the spreadsheet in the second format and template. A process for generating an output for a webpage, comprising: selecting a spreadsheet and a template stored by a server, the spreadsheet comprising a data set; associating the data set with an element in the template, such that when the data is associated with the template, changes made to the associated data is recorded in realtime in both the spreadsheet and template; and generating the output comprising the data associated with the template.

20 Claims, 4 Drawing Sheets

(56) References Cited

U.S. PATENT DOCUMENTS

| | | | |
|---|---|---|---|
| 2004/0049558 A1* | 3/2004 | Lee | G06F 16/93 709/219 |
| 2005/0010861 A1* | 1/2005 | Augustyn | G06F 40/18 715/213 |
| 2005/0268215 A1* | 12/2005 | Battagin | G06F 17/246 715/209 |
| 2007/0033262 A1* | 2/2007 | Labelle | H04L 63/12 709/217 |
| 2007/0074103 A1* | 3/2007 | Zeller | G06F 17/227 715/205 |
| 2007/0129014 A1* | 6/2007 | Bertorello | H04L 51/04 455/41.2 |
| 2007/0162840 A1* | 7/2007 | Rochelle | G06F 17/2247 715/210 |
| 2007/0168868 A1* | 7/2007 | Korzenko | G06F 17/218 715/732 |
| 2007/0245223 A1* | 10/2007 | Siedzik | H04L 67/1095 715/203 |
| 2009/0083619 A1* | 3/2009 | Davis | G06F 16/9558 715/234 |
| 2009/0089394 A1* | 4/2009 | Krueger | G06F 15/16 709/216 |
| 2009/0172553 A1* | 7/2009 | Sikka | G06Q 10/10 715/733 |
| 2010/0211862 A1* | 8/2010 | Parish | G06F 17/246 715/212 |
| 2010/0235321 A1* | 9/2010 | Shukla | H04L 67/10 707/610 |
| 2012/0101980 A1* | 4/2012 | Taleghani | G06F 40/166 707/608 |
| 2012/0151378 A1* | 6/2012 | Parish | G06Q 10/101 715/751 |
| 2012/0313953 A1* | 12/2012 | Owen | G06F 17/246 345/581 |
| 2012/0331377 A1* | 12/2012 | Howell | G06F 17/2205 715/234 |
| 2013/0151938 A1* | 6/2013 | Waldman | G06F 16/958 715/210 |
| 2013/0262975 A1* | 10/2013 | Rochelle | G06F 17/246 715/220 |
| 2013/0339882 A1* | 12/2013 | Owen | G06F 17/246 715/762 |
| 2014/0082470 A1* | 3/2014 | Trebas | G06F 40/18 715/217 |
| 2014/0115448 A1* | 4/2014 | Owen | G06F 17/246 715/249 |
| 2014/0136936 A1* | 5/2014 | Patel | G06F 17/2247 715/212 |
| 2014/0164895 A1* | 6/2014 | Matheson | G06F 17/246 715/212 |
| 2015/0193421 A1* | 7/2015 | Chitilian | G06F 17/246 715/217 |
| 2015/0212980 A1* | 7/2015 | Rochelle | G06F 17/2247 715/218 |
| 2015/0227502 A1* | 8/2015 | Krueger | G06F 15/16 715/220 |
| 2016/0026616 A1* | 1/2016 | Vogel | G06F 17/243 715/219 |
| 2016/0026730 A1* | 1/2016 | Hasan | G06F 17/30896 715/234 |
| 2016/0055140 A1* | 2/2016 | McKenzie | G06F 21/128 715/212 |
| 2016/0224517 A1* | 8/2016 | Horn | G06F 40/197 |
| 2016/0224535 A1* | 8/2016 | Mathur | H04L 41/22 |
| 2016/0378842 A1* | 12/2016 | Demonsant | G06F 17/30563 707/602 |
| 2017/0031872 A1* | 2/2017 | Bosma | G06F 17/2247 |
| 2018/0101515 A1* | 4/2018 | Rochelle | G06F 8/34 |

* cited by examiner

SYSTEM AND PROCESS FOR GENERATING AN INTERNET APPLICATION

CROSS-REFERENCE TO RELATED APPLICATION

Australian Provisional Patent Application No. 2015903445, with a filing date of Aug. 26, 2015, is incorporated herein by reference.

FIELD OF THE INVENTION

The present invention relates to a data transformation system. More particularly, the present disclosure relates to a spreadsheet converter for generating an output suitable for use with an internet webpage.

BACKGROUND OF THE INVENTION

Spreadsheet applications for computers have become commonplace in an office or business environment. Spreadsheets are generally used to perform a number of numerical analysis or calculations based on function entered into the spreadsheet. Typically, a spreadsheet is used to generate a graphic or image, such as a graph for data sets. While spreadsheets provide a versatile means for reporting there are a number of difficulties associated with displaying spreadsheet data, particularly graphs, on interactive websites or online platforms. Further difficulties arise when attempting to generate an interactive graph or use data associated with an equation contained within a spreadsheet for online applications.

Software applications currently exist which can convert a spreadsheet data into a suitable programming language such as hypertext markup language (HTML), JavaScript, css and other machine language code. However, to convert this data into a suitable internet format which typically takes a significant amount of time coding, which can be days to months of time, and is generally very costly and heavily reliant on the complexity of the data in the spreadsheets, particularly with respect to interactive graphs or complex equations. In addition, these applications do not allow the use of embedded data without significant manipulation into a coding format compatible with standard internet formats, such as HTML.

HTML is commonly used to generate a website with a basic structure including headings, paragraphs and other elements such as images and tables. However, converting spreadsheet data into a HTML format requires a significant amount of time and expense. In addition, generating HTML script or code based on data from a spreadsheet does not allow data to be readily transferred back into a format suitable for entry into a spreadsheet document. As such, if data is altered, modified or added during HTML coding, a user must also manually add the new data in a format which is compatible with the spreadsheet, and vice versa. This may generate a significant amount of double handling for an organisation which can be costly and consume a significant amount of time.

Further, formatting data for output on a digital display can be difficult and commonly results in misaligned or visually displeasing formatting. This can lead to bad user experience with an application or website and user dissatisfaction. In addition, the prior art does not typically allow for higher processing functions of converted spreadsheets, such as realtime graphic of functions or interactive graphs or tables.

Other common internet formats to which text is converted includes; JavaScript, W3C, direct markup language, Web Application Description Language (WADL), or any other suitable internet/web language or code. These coding formats also have substantially the same problems associated with the spreadsheet compatibility and conversion of data expenses and time constraints.

Other issues and time delays can arise when converting a spreadsheet for webpage viewing, and even more so when adapting data for an application to be viewed on multiple device display sizes. Developing a webpage or application which can automatically alter or move the elements on a page or display a webpage or application with a dynamic display based on the orientation of a device can take a considerable amount of time and is a significant cost for a new website or application. This is exacerbated with the need for web applications or websites to alter the size of the output for varying display sizes. More particularly, there is a significant amount of coding required to adequately display a webpage on a cellular or mobile device such as a smart phone.

Any discussion of the prior art throughout the specification should in no way be considered as an admission that such prior art is widely known or forms part of common general knowledge in the field.

SUMMARY OF THE INVENTION

Problems to be Solved

It may be an object of the present invention to provide a system for dynamically adapting data to display to a user.

It may be an object of the present invention to provide a system for adapting a spreadsheet for display on a portable device.

It may be an object of the present invention to provide a system or process for automatically adjusting an output display based on a viewing device screen size.

It may be an object of the present invention to provide a system or process for a bidirectional conversion of information.

It may be an object of the present invention to provide a system or process for rendering information into an internet application.

It may be an object of the present invention to provide a system or process for transforming information between a document and an internet application.

It is an object of the present invention to overcome or ameliorate at least one of the disadvantages of the prior art, or to provide a useful alternative.

Means for Solving the Problem

A first aspect of the present invention may relate to a system for converting a spreadsheet in a first format to a spreadsheet in a second format, the system comprising; a server including a storage means; the storage means adapted to store the spreadsheet in the second format and store at least one associated template; at least one data set associated with the spreadsheet in the second format, such that the at least one data set is adapted to be associated with the template to be displayed on a client device; and wherein when data is associated with the template, changes made via the client device to the associated data is recorded in realtime in both the spreadsheet in the second format and template.

Preferably, the second format is XML format. Preferably, the storage means is at least one of a non-volatile storage medium and a cloud. Preferably, the client device is at least one of the group of; a smart phone, a laptop, a computer, a mobile device, a tablet, and a personal digital assistant. Preferably, changes made to the associated data is recorded in spreadsheet in the first format. Preferably, the template is rendered with the associated data to generate an output. Preferably, the storage means is adapted to further store the output. Preferably, the output is adapted to be dynamically resized for display on the client device. Preferably, the output is at least one of; a word document, a spreadsheet, a webpage, a website, a code, a script, an application, a PDF, a presentation, a slideshow, and a report. Preferably, the at least one data set includes at least one of; alphanumeric text, a formula, an equation, an algorithm, embedded data, graphs, charts, flow diagrams, images, audio data and video data. Preferably, changes made to an output or the template can be recorded in the second format, such that the at least one data set is translatable bidirectionally.

Another aspect of the present invention may relate to a process for generating an output for a webpage; the process including the steps of; selecting via a client device at least one spreadsheet and at least one template stored by a server, the at least one spreadsheet comprising a data set; associating the data set with an element in the template, such that when data is associated with the template, changes made via the client device to the associated data is recorded in realtime in both the spreadsheet and template; and generating the output comprising the data associated with the template.

Preferably, the data set is at least one of; alphanumeric text, a formula, an equation, an algorithm, embedded data, graphs, charts, flow diagrams, images, audio data and video data. Preferably, the spreadsheet comprises a plurality of data sets. Preferably, the output is adapted to dynamically resize on the client device with respect to a display means of the client device. Preferably, the output generated is at least one of; a word document, a spreadsheet, a webpage, a website, a code, a script, an application, a PDF, a presentation, a slideshow, and a report. Preferably, the spreadsheet is uploaded to the server in a first format and is converted to a second format. Preferably, the second format is a XML format. Preferably, the server stored the output generated. Preferably, the client device stores the output generated. Preferably, the output is generated by aggregating the associated data with the template in an aggregator.

In the context of the present invention, the words "comprise", "comprising" and the like are to be construed in their inclusive, as opposed to their exclusive, sense, that is in the sense of "including, but not limited to".

The invention is to be interpreted with reference to the at least one of the technical problems described or affiliated with the background art. The present aims to solve or ameliorate at least one of the technical problems and this may result in one or more advantageous effects as defined by this specification and described in detail with reference to the preferred embodiments of the present invention.

DETAILED DESCRIPTION

Figure 1:
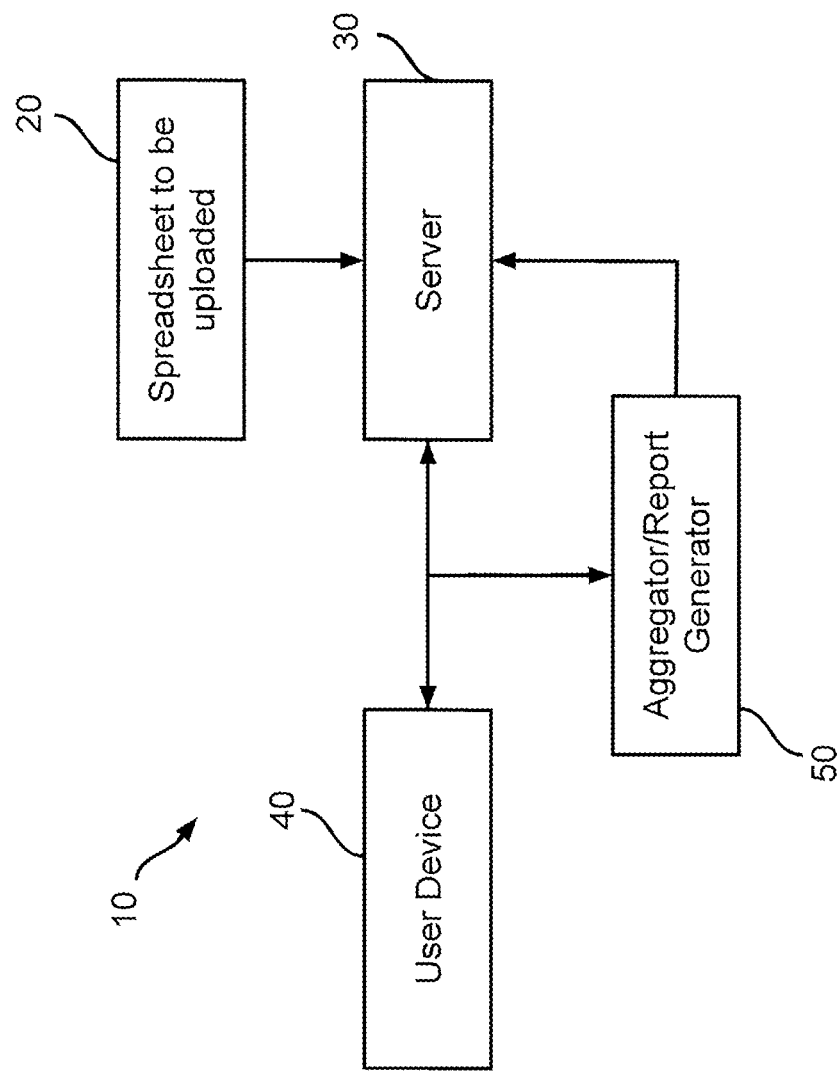
FIG. 1 illustrates a broad embodiment of the system for generating an internet application.

Preferred embodiments of the invention will now be described with reference to the accompanying drawings and non-limiting examples.

In a broad aspect, the present application is directed towards a system and process for converting a spreadsheet into Extensible Markup Language (XML), or an XML derivative, such that it may be used to generate an output suitable for viewing on a display device. XML is a markup language that defines a set of rules for encoding documents in a format which is both human-readable and machine-readable. It is defined by the W3C's XML 1.0 Specification and by several other related specifications, all of which are free open standards. Preferably, the output is an internet or online application, such as a website, a webpage, a web interface, a smartphone or a tablet interface or any other suitable online format which can preferably be hosted by a web domain. The system may be adapted to provide a compatible output for exiting HTTP architecture of the internet.

Generally, the spreadsheet comprises 'data-intensive information' which may comprise a number of calculations, such as formulae, graphics, images or charts. A spreadsheet is a desirable format which is adapted to organise information to at least one of create, generate, view, edit, track, manage and/or maintain the data-intensive information. With the proliferation of computer technology and the commonality of computer devices, an internet application has become a preferred way of allowing consumers to interact with data-intensive information. Interacting with the data-intensive information can include consuming the information, allowing consumers to create other value-added information or alter the data-intensive information.

Preferably, the system or process is adapted to transform the data-intensive information stored in a typical spreadsheet into an internet application. Any suitable interface may enable content owners to author or generate data-intensive information in a spreadsheet, and display the data-intensive information to consumers for consumption as an internet application. Preferably, the data-intensive information as perceived by a content owner in the form of a spreadsheet is equivalent to the data-intensive information displayed to a consumer in the form of an internet application. As such, there is no loss of data between the spreadsheet and the internet application, however the content owner can restrict access to data or hide predetermined data sets from a consumer. Further, not every data set from a spreadsheet is required to be used to generate an internet application. For example, the content owner may only assign a single data set from a spreadsheet to display to a consumer.

The data-intensive information associated with the internet application can be translated back to the spreadsheet, or a further spreadsheet, such that the data is bidirectional. This allows information from either the spreadsheet or the internet application to be optionally translated to the other respective format (i.e. information from the internet application is translated to the spreadsheet, or vice versa). This allows an equivalent data set or at least a portion of the data-intensive information to be easily translated between a spreadsheet and an internet application which is not possible using html coding or other commonly used coding methods as the data cannot be converted into a format suitable for a spreadsheet. When information is presented in the form of an internet application, it can be adapted for display to end-users in a variety of devices (e.g. portable devices) and formats (e.g. different viewing device screen size).

Referring to FIG. 1, there is depicted a simplified embodiment of the system 10. The system 10 is adapted to receive a document or spreadsheet 20 and store the document on a server or storage device 30. The document 20 can be uploaded by a user, company or client with authority to upload a document to the system. In at least one embodiment, the server 30 is a data repository which stores at least one data set, which is preferably stored in a database. The server 30 can be a non-volatile memory medium, a cloud or any other suitable computer readable medium for storing electronic documents. The spreadsheet 20 may be in a standard spreadsheet format such as; .gnumeric, .ods, .xls, XMLss, comma-separated values, CVS application support, Data Interchange Format, Symbolic LinK (SYLK), Tab-separated values or any other spreadsheet format, which may include a derivative of any one of the previous formats. Another common spreadsheet format is ".xls" used by Microsoft Excel™. It will be appreciated that the system can be adapted for use with other known spreadsheet formats.

The server 30 is adapted to be in communication with at least one user device 40 which can access the server 30. The device 40 allows a user of the system to interact with at least one file, document or spreadsheet 20 associated with the server 30. The system may further allow a user to interact with a client profile or a template associated with the system. When a user interacts with the spreadsheet 20, a copy spreadsheet 21 is uploaded to, or displayed on, the user device 40. The copy spreadsheet 21 is isolated from the original spreadsheet 20 stored by the server 30. Isolating the copy spreadsheet 21 from the server 30 allows an ancestor document to be generated if changes are made to the spreadsheet 21. This allows changes which are made to the copy spreadsheet 21 to be isolated from the original spreadsheet 20. If changes are made to the copy spreadsheet 21, and the copy spreadsheet 21 is saved, the original document 20 becomes an ancestor document 20A and the copy spreadsheet 21 becomes the newest document 20. Preferably, the system 10 retains all previous documents uploaded or saved by the system, and may allow a user to access an ancestor document 20A instead of the document 20. For example, if a copy spreadsheet 21 of a spreadsheet 20 is uploaded to a user device 40 and at least one change is made to the copy spreadsheet 21, the copy spreadsheet 21 is saved by the system as the newest spreadsheet 20 and retains the original spreadsheet 20 as an ancestor document 20A on the server.

Optionally, the system may then access at least one of the spreadsheets 20 or 20A, or any other predecessor or ancestor spreadsheet document associated with at least one of the spreadsheets 20, 20A.

It will be appreciated that a document 20 or spreadsheet family may be created upon uploading a spreadsheet 20 to the server 30. A family identifier or family number may be associated with a document 20 which may allow a user to easily identify a particular document. For example, the system 10 may have a user associated with five hundred families stored on the server, with each document corresponding to a different webpage or application, and the user requests to access family forty-six to edit a predetermined webpage. This allows the user to easily find the correct document without searching for extended periods of time. A family identified can be manually assigned by a user, or may be automatically assigned by the system 10.

The system 10 may further allow at least one of; merging of documents 20 associated with the server 30, viewing of multiple documents 20, or generating a mark-up copy of a document in which changes made to a first document relative to a second document 20 can be viewed by a user. Any mark-up changes can be generated while editing a copy document and may be assigned a user identifier, such that marked-up or edited data can be easily associated with the user who edited the document. In an embodiment, a mark-up view may be generated for a copy document 20A relative to an ancestor of document 20A when the user generates the copy document 21. It will be appreciated that if the system 10 is adapted to view or compare multiple documents, the documents are not required to be from the same family, but preferably include at least one matching data set. Optionally, merging documents generates a document with a plurality of tabs or pages, in which each page or tab contains one of the merged documents.

Figure 3:
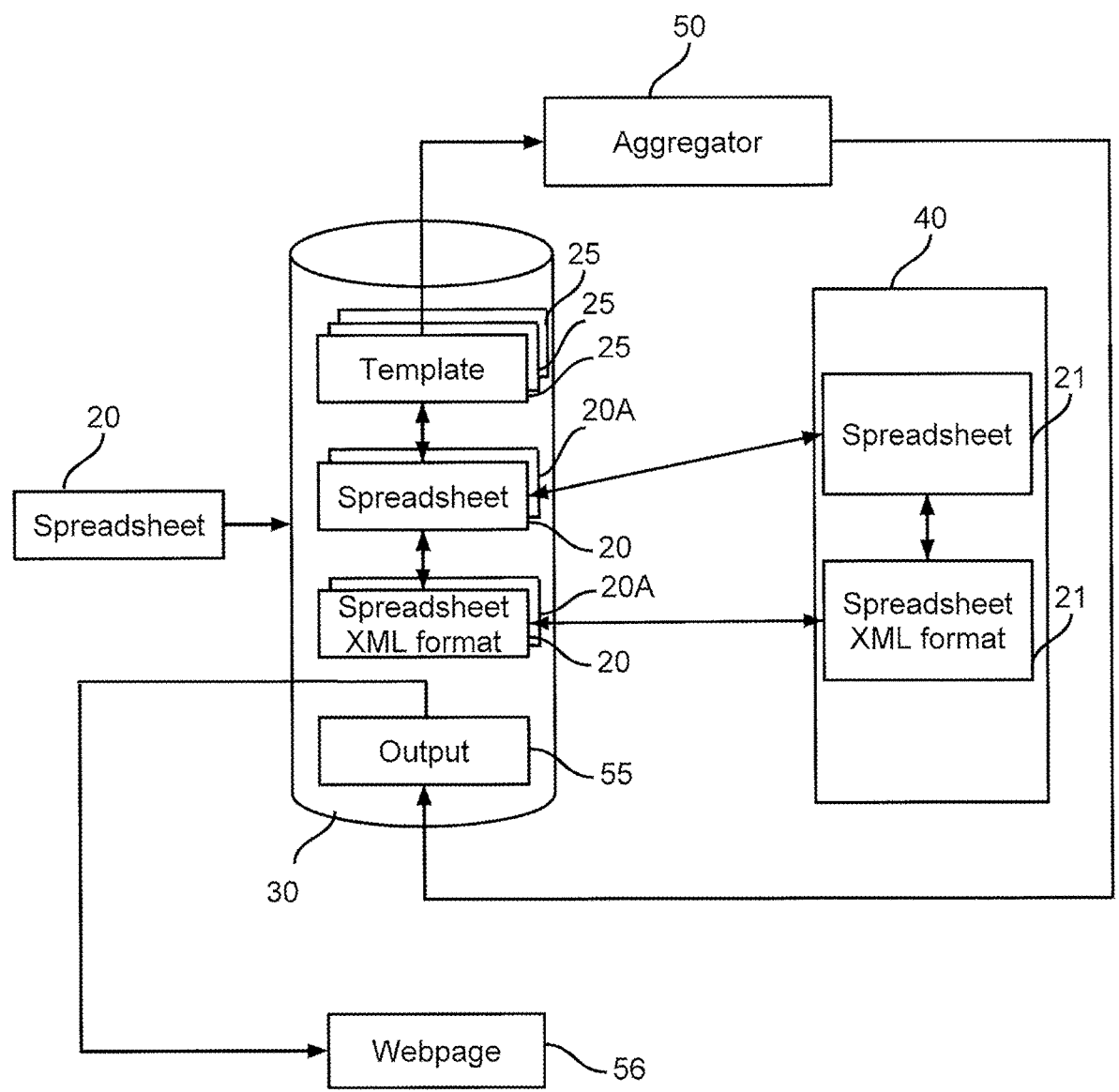
FIG. 3 illustrates another embodiment of the system of the present invention for generating an internet application.

As shown in FIG. 3, the system is adapted to generate an ancestor document chain or family document chain (herein referred to as a "document chain"). A document chain is generated when an original document 20 is uploaded to the server 30 and a user generates at least one new or modified document 21. A document chain may allow a user working with a document 20 to view and/or make a copy spreadsheet 20 which has previously been stored by the server 30. The copy spreadsheet 20A may form the newest document in the document chain such that if at least one further copy 20AA (not shown) is generated, the system can access an earlier version of the document if there is an ancestor document 20A. If a user has generated a copy 21 and reverts back or accesses a previous document 20A, a new copy spreadsheet 20B (not shown) is generated which may start a fork in the chain. If a fork in the chain is generated, documents 20A and 20B (not shown) may be isolated from one another respectively, but still have the same common ancestor document 20A. It will be appreciated, that more than one fork may be generated along a chain. Obsolete forks or discontinued forks in document chains may have restricted access or may be locked, such that a user cannot generate an editable copy of the document without authorisation or a password.

Optionally, a user may assign a key, an authority signature, a lock or any other security feature to a document to prevent unauthorised persons from editing or altering a document 20. This may include cryptographically securing an account or document 20 associated with the system 10. Cryptographic securities may be, for example, a cryptographic algorithm or hash function.

While the system 10 is preferably adapted to allow access to ancestor documents 20A, a user may be required to have authorisation to access at least one ancestor document 20A. An ancestor document 20A may be date stamped or be associated with at least one data set which may identify a user of the system who created the document or edited the document. The document may further be assigned mark-up changes or a viewable record of modifications, such that if a user accesses an ancestor document 20A they may compare the ancestor document to a relative document, associated preceding document or the current document 20 stored on the server 30. Further, an ancestor document 20A can be locked at a predetermined length. For example, the system can be adapted such that an ancestor document 20A in a document chain can be locked when it is the fifth document from the newest document.

Figure 2:
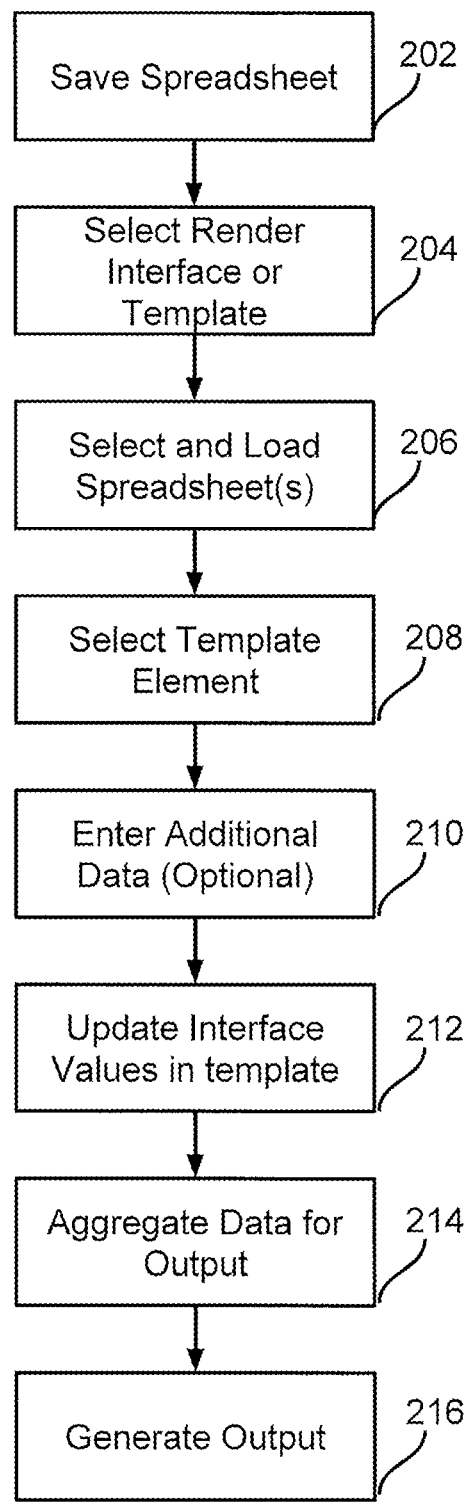
FIG. 2 illustrates an embodiment of a process for the use with the system of FIG. 1.

Referring now to FIG. 2, there is illustrated an embodiment of a process adapted for use with the system 10 for generating an output. At least one document 20, or more preferably a spreadsheet, is uploaded and stored by the server 202. The document 20 may be stored for a predetermined period of time, for example the length of a subscription to use the system, a second, a plurality of seconds, minutes, hours, days, weeks, months, or any other predetermined period of time. A document 20 may be assigned an expiry date or a locking date, which can delete it from the system or lock the document from being edited. It will be appreciated that at least one authorised user of the system has authorisation to unlock or lock a document.

The user selects a render interface or a render template 204 from the server or uploads a rendering template 25 compatible with the system. The rendering template 25 can be a wireframe or other web page template 25 which can be assigned data by the system 10. At least one document 20 or ancestor document 20A is selected by the user via a user interface or user portal 206. In this embodiment, the document is a spreadsheet comprising at least one data set. A data set from the spreadsheet can be assigned or rendered to the rendering template, and more particularly to a selected element of the rendering template 208. Simultaneously, as the user edits a document or a spreadsheet, a copy of the document in XML format is also edited to record the changes. It will be appreciated that at least the copy document 21 and the XML format of the copy document will comprise substantially the same data sets. Hence, the user can choose to edit the spreadsheet or the template, or add additional data 210. If the user edits the data, either in the template 25 or the spreadsheet, the data in the respective other will be also edited to reflect the changes made in the template 25 or the document. The bidirectional editing of the document and the template 25 cannot be performed with script or code as the data. This is due to the script or code requiring significant editing or rewriting to be in a format suitable for a webpage which results in the script of code not being in a suitable format for a spreadsheet.

In at least one embodiment, the system 10 is adapted to display changes or edits in realtime, such that the user can view changes made in the template 25 and/or the spreadsheet simultaneously. It will be appreciated that changes can be reflected in the spreadsheet, the XML spreadsheet and the template 25 simultaneously. The template 25 may further display an anticipated output to the user, such that a user does not need to generate a final output to view how data looks applied to a template, for example an internet webpage or internet application may be displayed to a user. This can reduce the time required for a user to generate a webpage or other output for an internet or other electronic application.

The system can be adapted to load a copy spreadsheet 21 of spreadsheet document 20 to a user device 40 and isolate the copy spreadsheet 21 from the original spreadsheet document 20, such that changes made to the copy document 21 are not recorded in the original document 20. More than one document 20 can be loaded by a user such that multiple documents can be used to generate at least one output. If multiple documents are required to generate the data for the template, the multiple documents can be optionally merged into a single document. Alternatively, the template 25 may source data from multiple documents from different families and save each document as a new fork or the newest document in a document chain.

After the selected data sets have been assigned to the template 25 and any optional edits have been made, the user can update interface values 212 or assign any optional rules to the template. Rules can be used to display data in a desired manner or in a particular predetermined format. Preferably, the template 25 is assigned at least one rule with respect to how to display elements or data for different display devices. For example, a rule can display the elements on the template 25 to a user in a predetermined manner for a laptop device and can display elements in a secondary predetermined manner for a smart phone device. This functionality generally requires a significant amount of coding in previously known systems to generate a desired output; however the rules assigned to the template 25 may avoid delays and difficulties with generating outputs with varying sizes.

Once all of the desired rules have been assigned to the template 25 or the data assigned thereto, the template 25 passed through an aggregator 214 (which may also be referred to as a render interface) to generate an output 216. The output is preferably a webpage or comprises a plurality of webpages to generate a website, or may be an internet application. If more than one webpage is required, the system may merge or aggregate a number of data sets and/or templates to generate multiple webpages. Other outputs from the system can include; PDFs, spreadsheets, slide show presentations, document files or any other predetermined output. Preferably, the output generated is in a format suitable for displaying as a webpage.

The output can comprise interactive features, such as audio, video, interactive graphs, input fields, dropdowns, lists, or any other predetermined interactive feature. The features are generated from the data assigned to the template 25 from the at least one spreadsheet.

The aggregator can be a runtime application which renders the selected data into the template. The runtime application can be associated with at least one rule or modifier which can manipulate data during rendering of the data into the template. As a wireframe typically lacks typographic style, colour, graphics or other stylised elements, rules may be used to define these features within the template. Preferably, a predetermined threshold is triggered by at least one data set highlighted within the spreadsheet. Triggering a predetermined threshold may be caused by at least one of; a data set exceeding a predetermined value, a missing data set, an incorrect data set, an incomplete data set, a document format, a data format or any other value which may be exceeded. It will be appreciated that a rule may assign any predetermined attribute to a data set or a rendering template 25 to produce a desired output 55. Optionally, a report can be generated if there are any errors with rendering the template 25 or generating an output 55. The report may comprise instructions or suggestions on how to remedy or solve errors or problems with at least one data set.

Preferably, the output 55 is webpage adapted to dynamically resize or move elements in the output 55 based on the display device used by a viewer of the output 55. For example, the output 55 may be different for a user of a computer and the user of a smart phone. It will be appreciated that resizing the webpage for different devices may add, remove, restrict or limit the information displayed to a user based on the device. For example, if the output 55 is resized for a smart phone, elements of the page may be excluded or simplified to produce a more user-friendly interface.

In yet a further embodiment, if a desired output 55 cannot be generated, the system generates a diagnostic or analysis report. The diagnostic or analysis report can provide advice to a user or assess at least one data set assigned to the template. This may allow a user to easily identify errors with output generation and remove the errors to successfully generate an output 55. The diagnostic or analysis report can also be generated with suggestions on how to improve a template 25 or an output 55 generated by the system. For example, if the system determines there may be a more user-friendly method of displaying data, a recommendation may be provided to the user.

In yet another embodiment, an XML format document is generated based on the original format document only when the original document is saved or a template 25 is to be rendered with at least one data set. This may avoid unnecessary XML format copies of a document being stored by the system and may reduce the rendering time for a template. Further, producing an XML document only during generation of the output may further reduce the processing time or reduce the processing power required for generating an output 55.

Data sets can be selected from the spreadsheets by selecting elements or cells within the spreadsheet and applying a matching association with an element within the rendering template. For example, a cell is selected or 'highlighted' and an element on the rendering template 25 is matched or associated with the highlighted cell. The data within the cell is then copied into the template 25 from the highlighted cell, which may include formulas, equations, algorithms, embedded data, graphs, charts, flow diagrams, images, audio, video, text or any other dataset assigned to a cell. Preferably, the data uploaded to the template 25 is taken from the XML format spreadsheet. It will be appreciated that the user may assign cells from the original format document, and the corresponding cell in the XML format document can be assigned to the template.

Highlighting a cell or data set preferably applies a viewable marker to a user, such that the user can visually identify which data is selected for rendering into a template 25, used for an output or used for another predetermined output 55. The viewable marker may be at least one of; bolding text, changing a text colour, changing a cell colour, applying a border to a cell, stylising font, or any other predetermined marker to allow a user to determine a difference between a highlighted cell and a non-highlighted cell. This provides a means for a user to ensure that only desired data is selected for an output 55.

In the context of this specification, an output 55 can be at least one of; a word document, a spreadsheet, a webpage, a website, a code, a script, an application, a PDF, a presentation, a slideshow, a report, or any other predetermined output. A document can be referred to as a spreadsheet.

Referring to FIG. 3, there is depicted another embodiment of the system. The system 10 adapted for allowing a spreadsheet to be uploaded to a storage medium. The storage medium is associated with a server which is adapted to communicate with at least one user device. A communication module or transceiver (not shown) allows communication between the server and at least one user device. A user interface or portal can be displayed on the user device which allows a user to interact with a portal of the server. The portal or user interface may be run from an online portal or via an application (app). Through the user interface, the user can interact with at least one stored document and/or a client profile. The document is stored in at least one database associated with the client profile, and the system comprises a further database which stores at least one rendering template. The rendering template 25 can also be associated with a client profile, or can be publically accessible by users of the system. The at least one database on the server can segregate documents or other data which relate to a client profile. Segregation of documents can allow family members to be generated. In this embodiment, a document is a spreadsheet document, such as a Microsoft Excel™.

Additionally, the user may manually divide or segregate documents or portions of a document into groups or into individual elements. For example, a single document may comprise all data relating to a company across multiple divisions or departments. As such, the system may separate the data into divisional or departmental sections such that each department can have restricted access to departmental data alone. Segregating documents may provide a database which can be searched or filtered. A client profile can further include information relating to a company, a user or a business. Examples of information include; a business name, a compilation of authorised users, authorised user access levels, contact details, private details, an address, a phone number, email address, a contact person, or an IP address of at least one authorised user. Other personal information or identifying information can also be optionally assigned to a client profile.

The system is optionally adapted to process and analyse a spreadsheet uploaded or associated with the server. Analysing the spreadsheet can identify data or data sets stored in the spreadsheet. The spreadsheet may comprise raw data, formulas or equations associated with at least one cell. The spreadsheet, or at least a portion of the spreadsheet, can be converted by the system and stored in a XML format. Alternatively, the user can select and assign data to be converted into a XML format. This allows only a portion of a document to be converted and can reduce the storage demands of the server 30.

Converting a document format has a number of advantages over writing data into script or code. More particularly, data with macros, visual basic, VBA code, equations, embedded programming or any other functions or data, assigned with a spreadsheet, can be used to generate an output 55 and are not lost during formatting into XML. In contrast, scripting or coding the data from a spreadsheet can result in lost data or require data to be manually entered into another format which may take a significant amount of time. Further, scripting or coding the data within a spreadsheet may commonly cause a number of significant problems, such as programming errors, lost data, unmatchable data sets, formatting errors or other data errors.

When a spreadsheet is selected a copy of the spreadsheet is generated such that the copy spreadsheet is isolated from the original copy. Isolating the original copy ensures that there is a backup copy which the user may revert to if there are any issues, such as data set corruption or other errors, when editing the new copy.

Once a template 25 and at least one spreadsheet have been selected, data from the spreadsheet can be rendered into the template. Data can be selected from a cell or an element within the spreadsheet and assigned to the template. The data element can be; alphanumeric text, a graph, a chart, an image, a pie chart, a bar graph, a line graph, a column chart, an area chart, a scatter graph or any other illustrative representation of data. The system may further allow an image, audio, a hyperlink or a video link to be assigned to the template. Optionally, data assigned to a graph may also be associated with the template 25 such that a graph can be interactively manipulated by a viewer of an output webpage 56.

To select data to be rendered onto the spreadsheet the user may select a cell and apply a marker. A marker may include; a text highlight colour, a text colour, a format change, a font change or alteration, a font size alteration, or any other marker which may identify to a user data which has been selected to associate with a template. Assigning data sets directly to the template 25 removes the requirement cells of a spreadsheet to be converted into script or code, such as HTML or JavaScript. The system may provide a simple means for generating elements or data to be displayed on a webpage or a website without turning data into script or code. This can potentially save a significant amount of time. Further, the system allows a user who is not skilled with coding or scripting to generate an output which may be suitable for a webpage, which can save a significant amount of resources.

Once a marker has been assigned to a cell or data set, the data set is assigned to a selected portion of the template. The system then updates interface values such that the data set is rendered to the template. The system can then generate an output based on the updated interface values. The output is preferably a webpage which is adapted to be displayed on at least one display size. More preferably, the output is adapted to be displayed on a plurality of display sizes, for example a computer screen and a portable device screen, such as a smart phone.

While the system is adapted to convert the document into a XML format, the system also retains the original document in the uploaded format. This allows the original document to be stored by the system in addition to the new XML format spreadsheet and ensures a backup is recorded if reformatting or other errors occur at a later time. Preferably, any document stored or converted by the system will continue to be stored as a copy in the format as initially stored. A stored document can be locked by the system such that it cannot be edited. However, if a document is locked a document may be copied to allow edits to be made to the copy of the spreadsheet. A locked document can optionally be deleted, restricted, hidden or assigned a predetermined attribute, by an authorised user of the system with a sufficient user level.

The user may optionally create changes in a document which is in an original format or make changes to a converted document in XML format. In either case the system is adapted to save and store a copy of saved changes in both the original format as well as a XML format. This creates a bidirectional storing of documents which easily allows any edits, modifications or changes made to the converted format document also saveable to the original document. Further, the system may be adapted to allow a user to edit data within the template 25 which can relay the same edits to at least one of the XML format document and the original format document.

Bidirectionality is not possible with HTML, or JavaScript or other internet based coding, as the code cannot be easily converted back into a format which is compatible with the original spreadsheet. This is due to script or code formats being incompatible with spreadsheet documents.

There are a number of significant advantages with bidirectionality, particularly the ability to store data in both an original format as well as XML allows a user to easily view any incorrect formulas, equations or data and more easily correct any errors or inconsistencies with a document. Bidirectionality further allows a user to maintain a progression or history of changes made.

In yet another embodiment the system is adapted to store a template 25 with associated data, such that a user may revert back to a previous template 25 which allows easy replacement or update of a webpage. Saving a template 25 may further allow a user to revert to an earlier template 25 or correct at least one error with a template 25 or data within a template 25 without having to remove an active template 25 from a webpage. Further, the system can store a work-in-progress, which comprises of at least one selected spreadsheet and at least one template, such that a user can make amendments or edits for generating an output across a desired period of time or incrementally.

The system may further be adapted to allow multiple templates to be used and merged into a single template 25 for a webpage. In one example, a user can select multiple documents and assign at least one data set from selected documents to a template 25 for rendering. If a user assigns multiple documents for rendering in a single template, the multiple documents may be merged into a new single document, which may be stored both in an original format and as a XML format. If multiple documents are merged, the multiple documents may form a new family or create a link between document chains. While documents can be merged, the system may only generate a new document based on the data from highlighted cells, such that any data not highlighted in the multiple documents, which is not relevant to the selected cells, is not copied into the newly generated document.

In yet another embodiment, the system is adapted to display to a user rendered data in realtime such that a user may view any changes rendered to a template. Viewing changes in realtime can allow a user to view errors or other anomalies within the spreadsheet, which allows a user to correct any potential errors before saving a copy to the storage medium.

When a user generates an output, the system uploads the reporting template 25 with any predetermined rendering rules, associated spreadsheets and highlighted data. Rendering rules can be assigned by a user of the system or assigned automatically by the system depending on an output. Generating an output simultaneously stores a further copy of the document in both an original format and a XML format. The output generated is then further stored by the system.

An authorised user can download an output from the server, display an output on a display device or store an output independently from the system. The output can be adapted to be used for an internet application, an intranet, a webpage or any other digital content. The user may optionally store the output in a printable format such that the output can be stored in a physical medium. It will be appreciated that if a copy of the output is downloaded to another device, the user may not require a connection with the system to interact with or view the document. The user may at a later time re-establish the connection with the server such that the document may be uploaded to the server.

Preferably, the output of the system is adapted to dynamically resize or scale the template 25 based on a user display device. Resizing or scaling the output of the spreadsheet may include adjusting the vertical and/or the horizontal alignment of the page. Further, the output can be adapted to move or resize individual elements on a webpage to generate a format which is more visually appealing or more user-friendly.

The system may further be adapted to compile or merge at least two outputs to generate a website. The outputs can further be assigned to a layout template 25 which allows outputs to be assigned to elements of the layout template. An element of a layout template 25 can be a webpage with at least one web address assigned thereto. This can allow a complete website to be compiled or aggregated from multiple outputs.

In at least one embodiment, the system may be adapted to convert a spreadsheet into XML or a derivative format of XML, such as XLSX which is a file extension for XML if the original file is a XLS file.

Optionally, the system is adapted to encrypt documents which are uploaded to the server. Any predetermined cryptographic algorithm may be adapted for used by the system, for example a SHA-2 hash function may be used to encrypt the data. Preferably, if the system adopts a hash encryption, the system further comprises a paired key, in which one part of the key is provided to the user and the other key is retained for a matching association by the system. A paired key may be similar to a private and a public key.

In yet another embodiment, the system is adapted to receive a document or output from another application. The application may generate a report document, preferably a spreadsheet, suitable for uploading to the system. The report document generated by the application comprises at least one data set which can be rendered into a template.

The system can be adapted for user subscription. The user subscription can be a multi-tier subscription system in which features of the system are restricted based on the user subscription tier or allowable based on the user tier level. At least two user tiers may be used by the system, in which the higher tier allows access to all of the features of the system and the lower tier subscription restricts a number of features for the user. It will be appreciated that any number of predetermined tiers may be used by the system.

In yet another embodiment, the system is adapted to generate a report document. The system may use the data contained within the spreadsheet to generate the report document. Preferably, the report document is generated with respect to a number of predetermined business rules. The business rules may dictate or influence the generation of the report and the information contained within the report. For example, data contained within a spreadsheet may include a data which may be confidential or private which may be required to be excluded from a report. As another example, rules may be set up to display a spreadsheet data in a summarised graphical form.

In one example, a report can be generated by the system at a management level which contains a detailed amount of information. The user of the system may then generate a report for an employee on a respective lower level, or for a shareholder, which preferably includes a lesser amount of information. The system may allow the user to redact, exclude or modify information displayed with the report for a predetermined viewer.

A user authorisation level can be associated with a user of the system, such that a predetermined user can view only predetermined documents or information. This can restrict confidential data from being accessed by users who do not have sufficient authorisation. An authorisation level can further be assigned a department marker which can further restrict or allow access to documents from at least one predetermined department. For example, if an accounting department marker is assigned to a user, only documents which have a corresponding 'accounting' tag can be accessed by the user.

The report generator can extract information from a document as raw data which may then be used to generate a report. Optionally, the system is adapted to extract data from a plurality of document formats such that a single report format document is generated. The report generator can further assign distinct markers or determine data markers within a document. The markers are preferably assigned manually by a user but can be automatically generated and assigned by the system.

A template 25 can be configured to communicate with at least one information architecture, a visual design or a conceptual structure. Other information may also be assigned to a template 25 which provides the necessary information for internet or online use. In a further embodiment, a report can be generated from an output received from an application or program not associated with the system.

In yet a further embodiment, there is provided a process for converting a spreadsheet into an internet application. The internet application is adapted to be suitable for consumption by consumers such as human users as well as automated agents (e.g. robotic internet services). The process includes the steps of: generating a first spreadsheet, or initial spreadsheet, which is preferably generated by a content creator or owner, generating a second spreadsheet, or modified spreadsheet, which is created based on at least one data set from the initial spreadsheet. A template engine, comprising at least one template is adapted to be associated with the modified spreadsheet. At least one data set is extracted from the modified spreadsheet by the template engine. A rendering interface can then adapt the extracted data set(s) for output and accepts inputs for processing. The rendering interface can interact with content consumers, preferably through client devices, such as a laptop, a smart phone, a cellular device, a computer or any other suitable device for displaying an output generated by the process, or through programmatic interfaces. Optionally, a client device may add to, modify, alter and/or delete at least one data set from the extracted data. Adding, modifying, deleting or altering data, can be processed by the rendering interface and template engine in real-time and any changes can be immediately made to the extracted data set. The template engine may also apply the changes made to the extracted data set in real-time back to the modified spreadsheet or optionally the initial spreadsheet. This allows for data to be bidirectional, which ensures more streamlined data processing and reduces delays caused by double handling data.

The initial spreadsheet is preferably stored in an environment which is at least one of a non-volatile storage medium and/or a cloud. Preferably, the client device is selected from at least one of the group of; a smart phone, a laptop, a computer, a mobile device, a tablet, and a personal digital assistant. Changes made to the extracted data set can be adapted to be recorded on the modified spreadsheet and also be recorded in the initial spreadsheet, after being recorded by the modified spreadsheet. Preferably, the render interface is adapted to render the extracted data set to generate an output. The output can be, for example, an internet application or webpage. The storage means is adapted to further store the output and any spreadsheet modifications desired to be saved by the user. The output is adapted to be dynamically resized for display on a client device.

Preferably, the output is at least one of; a word document, a spreadsheet, a webpage, a website, a code, a script, an application, a PDF, a presentation, a slideshow, and a report. Preferably, the at least one data set includes at least one of; alphanumeric text, a formula, an equation, an algorithm, embedded data, graphs, charts, flow diagrams, images, audio data and video data.

In a further embodiment, parts of the process may be adapted to use the simple object access protocol (SOAP) to form the foundation layer of a service stack, which may provide a basic messaging framework for communication with automated agents such as web services. SOAP allows for exchanging data from a XML format into structured information for web services. SOAP typically uses at least one XML data set for a message format and allows another application to convert the data for message negotiation and transmission. Using SOAP, in the rendering interface for example, may allow for an output that is typically more security compatible with internet services or web services.

It will be appreciated that other internet protocols or formats in place of SOAP may be used to enable communication with automated agents. For example, the rendering interface and template engine may be adapted to generate output compatible with common protocols such as hypertext transfer protocol (HTTP) or simple mail transfer protocol (SMTP), and may accept input in these formats for editing purposes.

For example, a system implementation may be adapted to send a SOAP request to a server which has web services enabled with the parameters for a search. The server may then return the result, in an XML format, with the data retrieved from the search. The retrieved data preferably comes in a standardised machine-parsable format, such that the requesting system can then integrate the result as edits to the data set or spreadsheet documents.

In yet another embodiment, the template engines and rendering interfaces may be available to the content creator/owner for selection. This allows the content creator or owner a choice to select a desired template engine which enables the content creator/owner to control the content of the final output, while the choice of rendering interface enables the content creator/owner to control the format of the final output and the acceptance of appropriate inputs from content consumers. Preferably multiple number of template engines and/or rendering interfaces may be selected so that the output is consumable by a variety of different client devices. Optionally, a client device can be assigned to be served, or adapted to interact with, a suitable rendering interface and/or template engine. For example, at least one of the template engine and the rendering interface may be designed to support consumption by authorised web services and other automated agents. Alternatively, at least one of the template engine and the rendering interface may be suitability designed to support consumption by user agents, such as a web browser. Changes made via the client device to the extracted data set is recorded in real-time in the modified spreadsheet by the template engine; at a later time, the template engine may choose to propagate the changes made to the modified spreadsheet back to the initial spreadsheet.

Preferably, the extracted data set is at least one of; alphanumeric text, a formula, an equation, an algorithm, embedded data, graphs, charts, flow diagrams, images, audio data and video data. Preferably, the initial spreadsheet and modified spreadsheet comprises a plurality of data sets. Preferably, the output is adapted to dynamically resize on the client device with respect to a display means of the client device. Preferably, the output generated is at least one of; a word document, a spreadsheet, a webpage, a website, a code, a script, an application, a PDF, a presentation, a slideshow, and a report. Preferably, the server stored the output generated.

Figure 4:
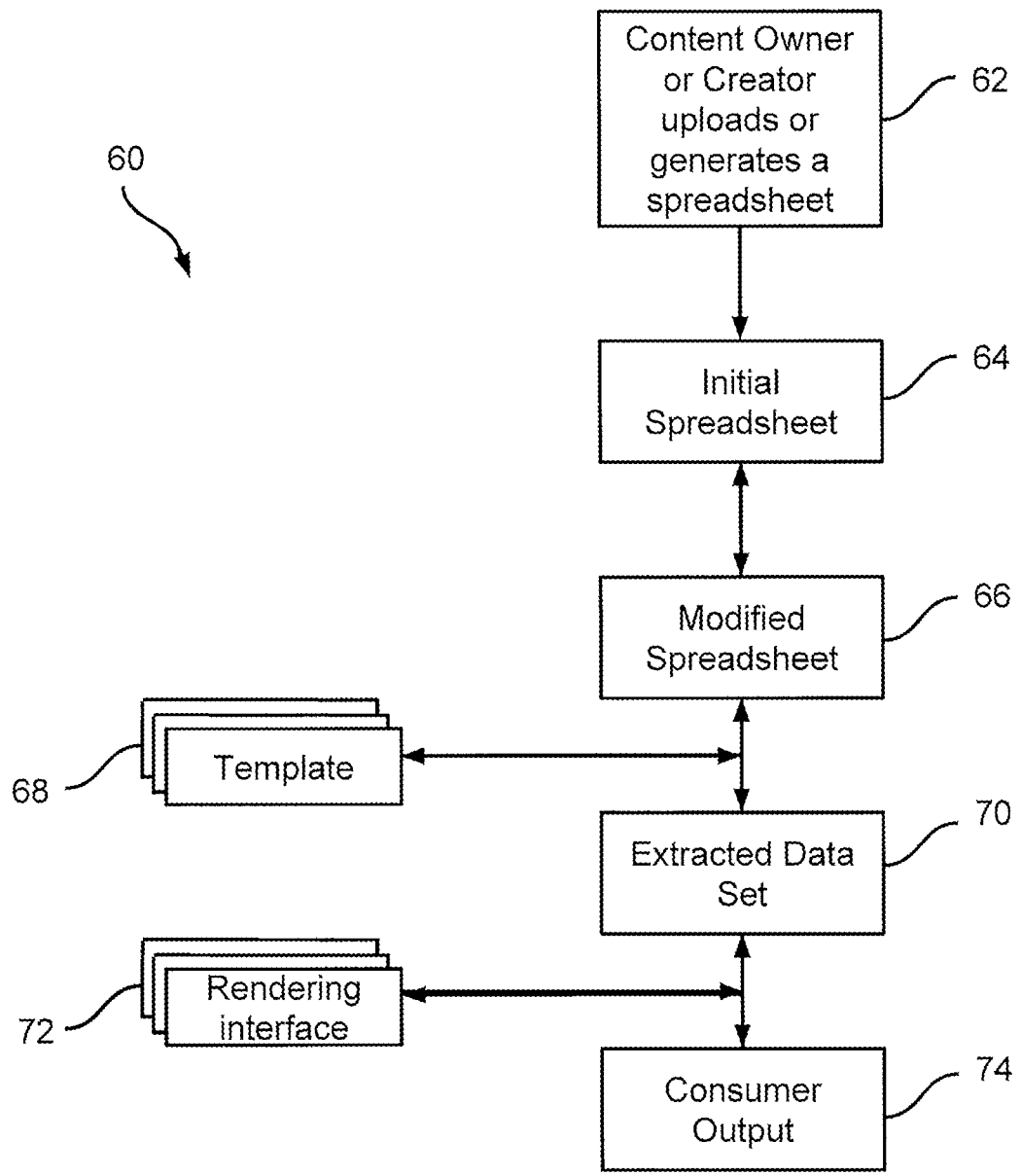
FIG. 4 illustrates another embodiment of process of the present invention for generating an output from a spreadsheet.

Referring to FIG. 4, there is depicted a flowchart of a process 60 for generating an output, such as an internet application. A user, such as a content creator or a content owner, generates or uploads an initial spreadsheet 62 to a database or server. The user then selects an initial spreadsheet 64 which instantiated or converted into a modified spreadsheet 66. The modified spreadsheet is preferably in an XML format, which may differ from the format of the initial spreadsheet. Both of the initial spreadsheet and the modified spreadsheet contain substantially the same data sets, if not the exact same data sets, and preferably only differ in document format. A template selected by a user 68 or a predetermined template is assigned at least one data set from the modified spreadsheet. The data assigned may be extracted cells 70, which have been highlighted, marked or otherwise selected and inserted into the template. The extracted data is formatted to be in a form suitable for rendering into an output and may accept additional inputs, either from another application, program or user input. The template arranges the data into a format which may closely resemble the final output, such as an internet application or internet webpage; it may also facilitate any modifications to the data at this point. Once the data has been extracted or assigned to the template and any modifications have been made by the user, a render interface or aggregator parses the data in the rendering interface 72 which generates a final output 74.

The final output may optionally be adapted to be modified by a user or an automated agent. Any modifications to the final output may generate a new data set which can be uploaded to the modified spreadsheet. This allows bidirectionality of at least one data set. Bidirectionality of data is advantageous as this reduces the potential for errors to be generated or may reduce the time to record data in both a spreadsheet and also an internet application format. It will be appreciated that for the data to be recorded into the modified spreadsheet, it optionally bypasses the template or the rendering interface steps. Alternatively, the rendering interface or template may convert or adapt the data to be in a format suitable to be recorded into the modified and/or initial spreadsheets. A further template or rendering interface may be used to allow bidirectionality of the data.

Alternatively, only newly added data or modified data prior to rendering is bidirectional, such that the final output cannot modify data contained in the modified spreadsheet or the initial spreadsheet. Preferably, a user may select from a plurality of templates and render interfaces. It will be appreciated that a plurality of initial spreadsheets may be selected to generate an output.

Although the invention has been described with reference to specific examples, it will be appreciated by those skilled in the art that the invention may be embodied in many other forms, in keeping with the broad principles and the spirit of the invention described herein.

The present invention and the described preferred embodiments specifically include at least one feature that is industrially applicable.

What is claimed is:

1. A system for converting a spreadsheet data into a format suitable for a particular device system, and/or operating system, the system comprising:
   a server including a non-transitory non-volatile storage medium;
   the non-transitory non-volatile storage medium adapted to store a spreadsheet that has been converted from a first format into a second format and store at least one associated template;
   at least one data set associated with the spreadsheet in the second format, such that the at least one data set is adapted to be associated with the at least one template to be displayed on a client device; and
   wherein when the at least one data set is rendered within the at least one template, changes made via the client device to associated data are recorded in realtime in the spreadsheet in the first format, the spreadsheet in the second format, and the template simultaneously;
   wherein when the at least one data set is modified, the modifications are recorded in realtime in the spreadsheet in the first format, the spreadsheet in the second format, and the template simultaneously; and
   wherein when the spreadsheet in the first format, the spreadsheet in the second format, or the template are modified, the modifications are also recorded in realtime in the at least one data set, which in turn renders realtime changes to the display on the client device.

2. The system as claimed in claim 1, wherein the second format is XML format.

3. The system of claim 1, wherein the non-transitory non-volatile storage medium is at least one of a non-volatile storage medium and a cloud.

4. The system of claim 1, wherein the client device is at least one of the group of; a smart phone, a laptop, a computer, a mobile device, a tablet, and a personal digital assistant.

5. The system of claim 1, wherein the server is adapted to create a new copy of the spreadsheet in the first format wherever and whenever changes are first recorded in the spreadsheet in the first format or the associated data.

6. The system of claim 1, wherein the template is rendered with the associated data to generate an output.

7. The system of claim 6, wherein the non-transitory non-volatile storage medium is adapted to further store the output.

8. The system of claim 6, wherein the output is adapted to be dynamically resized for display on the client device.

9. The system of claim 6, wherein the output is at least one of; a word document, a spreadsheet, a webpage, a website, a code, a script, an application, a PDF, a presentation, a slideshow, a report and an internet application.

10. The system of claim 6, wherein a bidirectional conversion system is created by having changes made to an output or the template recorded in the at least one data set, and then recorded in the spreadsheet in the first format, the spreadsheet in the second format, and the template simultaneously, while modifications to the spreadsheet in the first format, the spreadsheet in the second format or the template also effectuate changes in the at least one data set and on to the template and the output.

11. A process for generating an output for a webpage, the process including the steps of:
uploading at least one spreadsheet in a first format to a server and converting the at least one spreadsheet in the first format to at least one spreadsheet in a second format;
selecting, via a client device, the at least one spreadsheet in the second format and at least one template stored by a server, the at least one spreadsheet in the second format comprising a data set;
associating the data set with an element in the at least one template, such that the at least one template can extract a subset of data for output rendering on the client device when data is associated with the at least one template, changes made via the client device to the associated data is recorded in realtime in the at least one spreadsheet in the first format, the at least one spreadsheet in the second format, and the template simultaneously; and
generating the output comprising the data associated with the template.

12. The process of claim 11, wherein the data set is at least one of; alphanumeric text, a formula, an equation, an algorithm, embedded data, graphs, charts, flow diagrams, images, audio data and video data.

13. The process of claim 11, wherein the at least one spreadsheet in the second format comprises a plurality of data sets.

14. The process of claim 11, wherein the output is adapted to dynamically resize on the client device with respect to a display means of the client device.

15. The process of claim 11, wherein the output generated is at least one of; a word document, a spreadsheet, a webpage, a website, a code, a script, an application, a PDF, a presentation, a slideshow, and a report.

16. The process of claim 11, wherein the second format is a XML format.

17. The process of claim 11, wherein the server stored the output generated.

18. The process of claim 11, wherein the client device stores the output generated.

19. The process of claim 11, wherein the output is generated by aggregating the associated data with the template in an aggregator.

20. A method, executed on a server, for converting spreadsheet data into a format suitable for a particular device, system, and/or operating system, the method comprising:
storing a plurality of templates in a non-transitory non-volatile storage medium, wherein each of the templates can be assigned spreadsheet data;
converting a spreadsheet in a first format into a second format;
storing, in the non-transitory non-volatile storage medium, the spreadsheet in the first format, the spreadsheet in the second format;
displaying on a client device, a template selected from the plurality of the templates, wherein at least one element of the selected template displayed on the client device will be associated with at least one data set associated with the spreadsheet in the second format;
recording changes made to associated data with the client device in the spreadsheet in the first format, the spreadsheet in the second format, and the selected template, simultaneous and in realtime, when the at least one data set is rendered within the selected template;
recording modifications in the spreadsheet in the first format, the spreadsheet in the second format, and the selected template, simultaneously and in realtime, when the modifications are made to the at least one data set;
recording modifications in the at least one data set, in realtime, when the modifications are made to the spreadsheet in the first format, the spreadsheet in the second format, or the selected template; and
displaying on the client device, in realtime, the modifications made to the spreadsheet in the first format, the spreadsheet in the second format, or the selected template.

* * * * *